United States Patent
Eidesheim et al.

(10) Patent No.: US 7,190,089 B2
(45) Date of Patent: Mar. 13, 2007

(54) DEVICE FOR DETECTING PRESENCE OF A USER FOR MOTOR VEHICLE

(75) Inventors: Jean Eidesheim, Talence (FR); Pascal Bonduel, Bouzy la Foret (FR)

(73) Assignee: Valeo Electronique, Creteil (FR)

( * ) Notice: Subject to any disclaimer, the term of this patent is extended or adjusted under 35 U.S.C. 154(b) by 366 days.

(21) Appl. No.: 10/432,024

(22) PCT Filed: Dec. 3, 2001

(86) PCT No.: PCT/FR01/03815

§ 371 (c)(1),
(2), (4) Date: May 19, 2003

(87) PCT Pub. No.: WO02/45030

PCT Pub. Date: Jun. 6, 2002

(65) Prior Publication Data

US 2004/0046449 A1    Mar. 11, 2004

(30) Foreign Application Priority Data

Dec. 1, 2000   (FR) .................................. 00 16271

(51) Int. Cl.
*B60R 25/00* (2006.01)
*E05B 65/12* (2006.01)
*E05B 65/20* (2006.01)

(52) U.S. Cl. ........................................ 307/9.1; 180/287
(58) Field of Classification Search ................... 307/9.1
See application file for complete search history.

(56) References Cited

U.S. PATENT DOCUMENTS

| | | | |
|---|---|---|---|
| 3,937,976 A | 2/1976 | McGuirk | 307/10 |
| 5,402,075 A * | 3/1995 | Lu et al. | 324/664 |
| 6,075,294 A | 6/2000 | Van den Boom et al. | 307/10.1 |
| 6,825,752 B2 * | 11/2004 | Nahata et al. | 340/5.64 |

FOREIGN PATENT DOCUMENTS

| | | | |
|---|---|---|---|
| DE | 19925006 A1 * | 12/2000 | |
| EP | 0 314 143 | 5/1989 | |
| JP | 6162889 | 6/1994 | |

* cited by examiner

*Primary Examiner*—Robert L. Deberadinis
*Assistant Examiner*—Hal I. Kaplan
(74) *Attorney, Agent, or Firm*—Berenato, White & Stavish

(57) ABSTRACT

The invention concerns a device for detecting the presence of a user to allow and/or prevent access inside a motor vehicle, the vehicle comprising at least a decorative element fixed to the body (2) proximate to an opening (O), the device comprising at least an electrode detecting (1) the presence of a user and a processing circuit (5) connected to the detecting electrode. The invention is characterised in that the decorative element (ED) has at least an electrically conductive part (12) coupled at least partly with the detecting electrode (1) so as to form an active detecting surface.

21 Claims, 3 Drawing Sheets

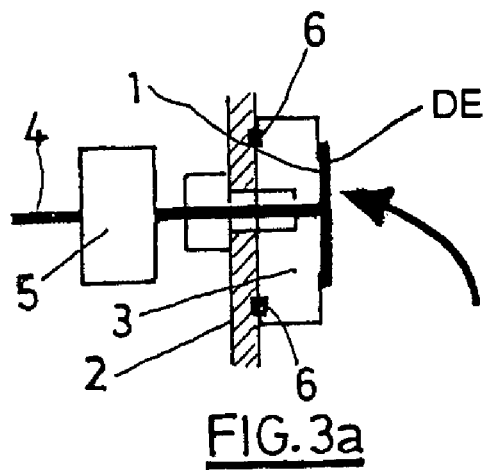
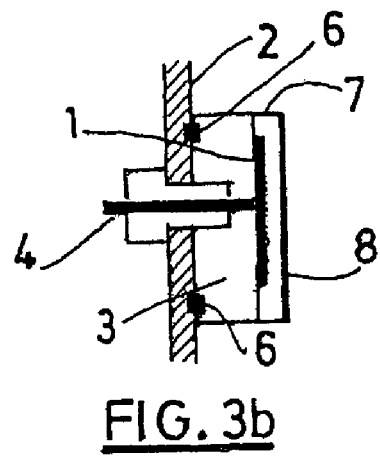
FIG. 3a FIG. 3b
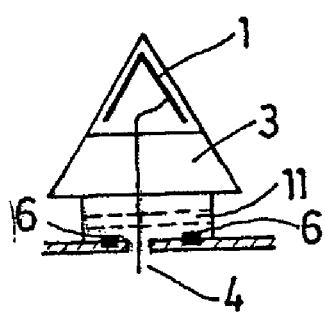 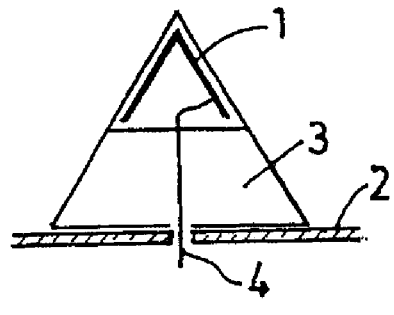 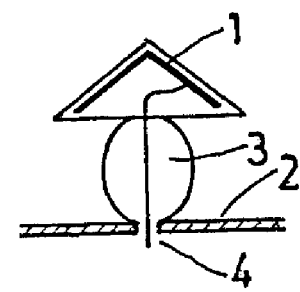
FIG. 6b FIG. 6a FIG. 6c
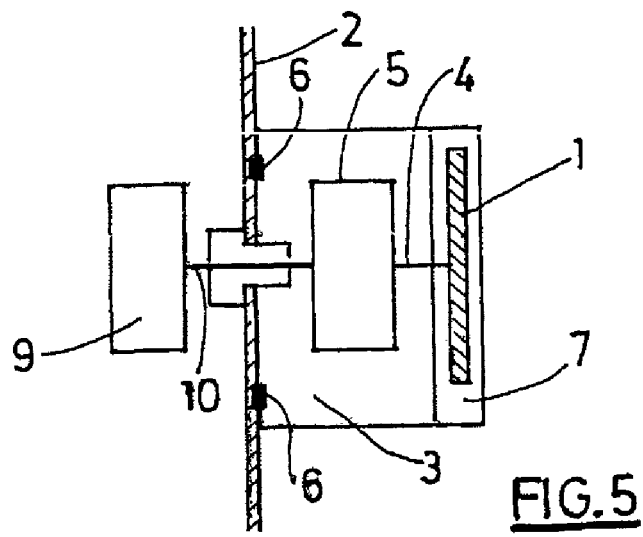
FIG. 5

DEVICE FOR DETECTING PRESENCE OF A USER FOR MOTOR VEHICLE

BACKGROUND OF THE INVENTION

1. Filed of the Invention.

The present invention relates to a device for detecting the presence of a user in order to allow and/or prevent access to the inside of a motor vehicle.

2. Description of the Related Art.

Such detecting devices are already used within the scope of an access system called a hands-free system in order to automatically trigger the release of the door of a motor vehicle as the user approaches, without the latter needing to use a key or a remote control. To carry out this automatic unlocking before opening the door, detection of the user is used to activate a remote exchange of data between an on-board recognition device on the vehicle and an identifier worn by the user. When the identifier is recognized as correct by the recognition device, the lock is released, thus allowing the user to open the opening leaf of the vehicle by grasping the handle. These known detecting devices are generally incorporated into the handles of the opening leaves of a vehicle since the detecting action takes place prior to opening the opening leaf. Thus, it is known, in particular from document U.S. Pat. No. 6,075,294, to place the detecting electrode of a presence sensor in a handle.

However, in some cases, it may be desirable to incorporate a presence detecting device directly into the bodywork of the vehicle. Thus, for example, document FR 2 740 501 teaches the use of a presence sensor in the rear of the motor vehicle around the trunk.

However, such a device requires fastening an additional casing containing the presence sensor to the bodywork.

One aim of the present invention is to provide a detecting device which can be placed in a preexisting decorative element on the vehicle.

This aim is achieved by the fact that the decorative element has at least one electrically conducting part coupled at least partially to the detecting electrode so as to form an active detecting surface. Thus, by virtue of the present invention, this device does not require an extra part to be added and fastened to the bodywork. This results in a substantial reduction in the cost price of the detecting device.

According to a first embodiment of the present invention, the electrically conducting part is coincident with the detecting electrode.

According to a second embodiment of the present invention, the electrically conducting part comprises, on the one hand, the detecting electrode and, on the other hand, a surface layer forming an offset electrode. In addition, an insulating part is inserted between the detecting electrode and the false electrode so as to form a capacitor.

Thus, advantageously, this capacitor protects the treatment circuit against electrical overload.

According to a third embodiment of the present invention, the decorative element has a tongue and is completely covered with a surface layer forming an offset electrode. The electrically conducting part comprises, on the one hand, the detecting electrode and, on the other hand, the offset electrode. A second insulating part is inserted between the detecting electrode and the offset electrode in order to form a capacitor. Thus, the detecting electrode and the electronic processing circuit are placed inside the vehicle so that the electrical wire connecting the electrical components of the detecting device is inaccessible from outside the vehicle. Consequently, the risk of theft of the vehicle by creating a short circuit in the electrical system is significantly decreased.

Advantageously, the device according to the present invention has the following features:

- the offset electrode is formed by a layer of electrically conducting paint.
- the capacitor has a capacitance of around ten picofarads.
- the insulating part comprises a layer of plastic or of rubber.
- the electrically conducting part is electrically insulated from the bodywork by a first insulating part.
- the thickness of the first insulating part is greater than about 1 mm.
- a closed housing, sheltered from water, is made in the first insulating part and designed to accommodate the electronic processing circuit. Thus, advantageously, it is not necessary to fasten an extra casing containing the processing electronics to the bodywork.
- the detecting device is formed by a touch-sensitive capacitive sensor such that the decorative element forms a clearly defined touch-sensitive surface. Thus, by virtue of this device, the user easily identifies the region for controlling the locking/unlocking of the locks and/or the opening/closing of the doors.
- the decorative element is in the form of a logo representing the make of the vehicle manufacturer, the model of the vehicle and/or the identity of the manufacturer. Thus this device has an esthetic appearance.
- the detection of a user is confirmed by the emission of a sound and/or light signal.
- the opening leaf is a trunk or a rear hatchback.

Moreover, it has been shown that integrating a sensor, consisting of detecting electrodes and an electronic processing circuit, in the bodywork presents many problems and especially that of false detections. These false detections arise, on the one hand, from significant exposure of the sensor to bad weather and, on the other hand, from interference due to the proximity of the sensor electrodes with the metal bodywork of the vehicle. In fact, bad weather (water, snow and other damp elements) causes false detections, which can be detrimental to the proper operation and to the reliability of the device.

A second aim of the invention is therefore to eliminate these drawbacks by providing a touch-sensitive detecting device which can be positioned directly on the vehicle bodywork while at the same time having improved detection reliability.

To this end, according to a variant embodiment of the present invention, the decorative element and/or the detecting electrode has, in cross section, sloping faces promoting the removal of water. Thus, by virtue of this structure, the touch-sensitive detecting device is positioned directly on the vehicle bodywork.

Preferably, the insulating part has at least one part forming a water channel so as to promote the removal of water.

Preferably, the insulating part forms a water channel and is made in the form of a groove made in the layer.

Advantageously, the first layer has an upper thickness of about 1 mm.

The touch-sensitive detecting device is advantageously used, within the scope of a hands-free access system, after prior identification of the user, in order to control functions:

- of locking and/or of unlocking the opening leaves of the vehicle, after prior identification of the user, in the case of a hands-free access system,
- of opening and/or of closing especially for the trunk.

Other features and advantages of the invention will become further apparent from the following detailed description. This description, which is purely illustrative and nonlimiting, relates to the exemplary embodiments described with reference to the appended figures, among which:

BRIEF DESCRIPTION OF THE DRAWINGS

FIG. 3a shows, in longitudinal section, a first embodiment of the present invention, in which at least part of the decorative element forms the detecting electrode, FIG. 3b shows a second embodiment of the present invention, in which the decorative element has a surface layer forming an offset electrode, FIG. 5 shows a fourth embodiment of the detecting device according to the invention, in which the electronic processing circuit is placed in the decorative element, FIGS. 6a, 6b and 6c have, in side section, several possible structural shapes for the detecting device.

DETAILED DESCRIPTION OF THE PREFERRED EMBODIMENTS

Figure 1:
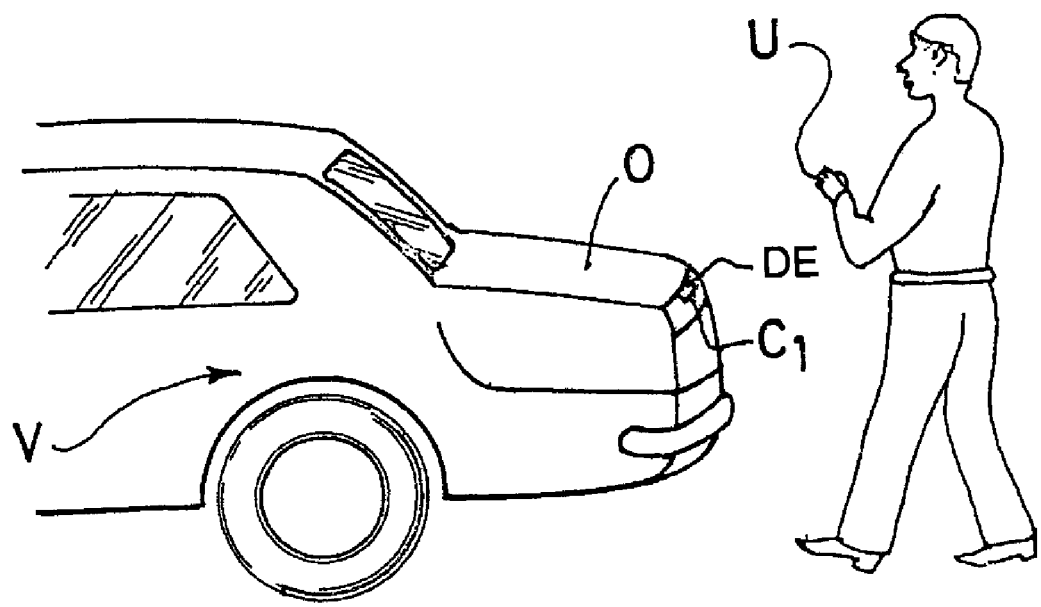
FIG. 1 shows a perspective view of a motor vehicle equipped, around the trunk, with a detecting device according to the invention.

In FIG. 1, a user U close to a motor vehicle V and facing an opening leaf O of the vehicle, in this instance the trunk, is ready to touch lightly on a decorative element DE positioned on the bodywork, for example at the center of the strip of the trunk. This decorative element, according to the invention, forms a presence sensor C1 of the touch-sensitive sensor or approach sensor type. This type of sensor makes it possible to detect contact by the user or the approach of a user in order to activate and/or control a given function. This sensor comprises an electrode for detecting a user and an electronic processing circuit connected to the electrode.

The decorative element DE shows a distinctive sign of the make of the vehicle or of the manufacturer and is positioned directly on the bodywork. Thus, the decorative element DE may take both diverse and varied shapes, namely geometrical, circular, etc. shapes, which may represent letters, figures, signs, etc. These various shapes form logos or pictograms representative of the make, of the model of the vehicle and/or of the identity of the manufacturer.

Figure 2:
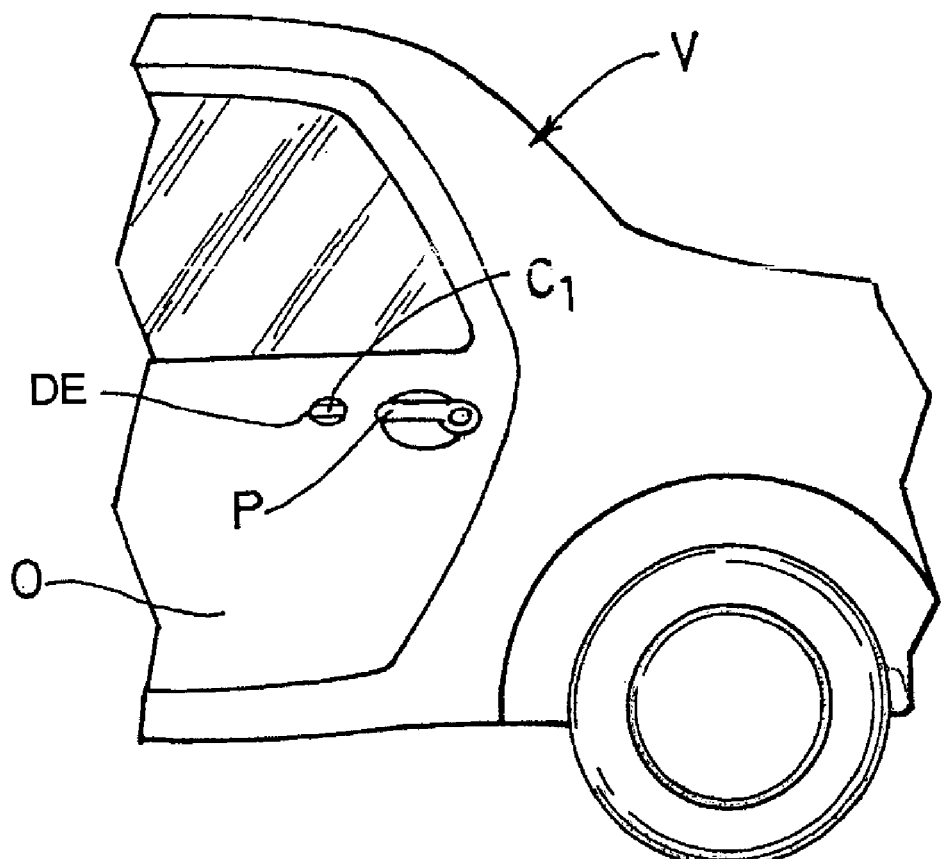
FIG. 2 shows a partial side view of a motor vehicle equipped, around a door, with a detecting device according to the invention.

FIG. 2 shows another placement of a decorative element DE on the vehicle in which a presence sensor is incorporated. In this representation, the decorative element DE is positioned on an opening leaf O, in this case a door, of a vehicle close to the location of the handle P of the door. The detection of contact by or the approach of a user by means of the sensor C1 via its detecting electrode may be combined with an audible warning so that the user is aware that he has clearly been detected. Thus, a characteristic sound is emitted on each detection.

As a variant or simultaneously, illumination of the decorative element may be provided in order to warn the user that he has been detected. This illumination may be achieved especially by means of an LED incorporated into the decorative element DE or into another element close thereto.

The integration of the sensor C1 into the decorative element DE makes it possible to avoid creating a new location on the handle or on the bodywork, or else on the trunk or doors of the vehicle. This is very economical since there is no extra piece to be added.

The presence sensor may be used for activating and/or controlling the various functions and especially in systems referred to as hands-free access and/or starting systems. Thus, the following may be used:

as approach sensor, as soon as the user lightly touches the sensor, in order to activate remote data exchange between a recognition device consisting of a central control unit onboard the vehicle and an identifier worn by the user. When the identifier is recognized as correct by the recognition device, the lock is released, and the user may open whichever opening leaf he desires, as element for controlling the locking of an opening leaf, the locking taking place after the portable identifier worn by the user has been recognized as correct. Specifically, after having left his vehicle or after having put certain objects in his trunk, the user may wish to carry out a deliberate action in order to lock his vehicle. The detecting device according to the invention may be used for this purpose. Thus, in the case of a trunk, when the user grasps his trunk in order to pull it down, he lightly touches the presence sensor and directly controls the locking of his trunk by means of a smooth movement.

as control element for opening or closing an opening leaf such as the trunk. In fact, at present, the trunks of some vehicles are provided with mechanisms allowing the automatic opening and/or closing of the trunk. These mechanisms operate mainly by means of motors but it is necessary to prevent them being inadvertently started. Thus, the presence sensor makes it possible to control the opening or the closing of the trunk after the prior recognition phase and possibly the unlocking phase have taken place. The detection for activating the initial data exchange may be carried out by the same presence sensor or by other means, for example an approach sensor or a touch-sensitive sensor positioned on a handle. When the same presence sensor is used, a time delay may be provided in order to distinguish the two control types.

It should also be noted that the sensitivity of the presence sensor is set to allow the detection of user contact when the latter wears gloves, which is often in winter.

FIGS. 3a and 3b show, in longitudinal section, two structures of the detecting device according to the invention. These structures allow operation, with a limited number of false detections, when the electrode is positioned on the bodywork of a motor vehicle. These configurations especially consist in removing the contact of the electrode with the metal present around and under it.

The representations 3a and 3b of the electrode and of the sensor after incorporation into a decorative element are representations in longitudinal section, the shape of the decorative element being very variable and mainly dependant on the manufacturer. In these figures, the electrode 1 is insulated from the metal surface of the bodywork 2 by means of a first insulating layer 3 forming a support element for the electrode. This first layer of insulator makes it possible to prevent the electrode coming into contact with the ground, formed by the vehicle bodywork. The first insulating layer 3 is preferably a plastic such as a rubber or a Teflon (registered trademark), and has a thickness which varies with the decorative element in which the sensor is incorporated. This thickness is generally greater than 1 mm and may be as high as 1 cm.

The electrode 1 and the first insulating layer 3 are kept fastened by clipping or adhesive bonding. The electrode 1—insulating layer 3 assembly, forming all or some of the decorative element DE, is held on the bodywork 2 via fastening means 6. These fastening means may be adhesive, screws, rivets or any other means allowing the decorative element to be held on the bodywork.

In some cases, especially when the decorative element is large or when it has a particular shape in its center, it may be desirable that only part of the decorative element has the functionality of a detecting device. Thus, the detecting electrode of the touch-sensitive sensor C1 will only be formed by part of the decorative element.

In other situations, the electrode 1 of the sensor will be formed by the whole of the decorative element.

According to the present invention, the decorative element DE has at least one electrically conducting part 12 coupled at least partially with the detecting electrode 1 in order to form an active detecting surface. The surface for detecting the approach by or contact with the user is called the active detecting surface. For example, when the presence sensor is a touch-sensitive sensor, the active surface consists of part or all of the outer surface of the decorative element.

The electrode 1 is connected, via a connecting wire 4, preferably formed by a coaxial cable crossing the first insulating layer 3 and the bodywork 2, to an electronic circuit 5 for processing data detected by the electrode 1. The electronic processing circuit 5 is positioned in the vehicle, in the trunk, or in the passenger compartment of the vehicle. It is connected to a management and control unit 9 of the hands-free system, positioned in the passenger compartment. This management and control unit enables the lock of at least one vehicle opening leaf O to be controlled electronically.

According to a first embodiment of the invention, shown in FIG. 3a, the electrically conducting surface of the decorative element DE is coincident with the detecting electrode 1. In this case, the electrically conducting part 12 is coincident with the detecting electrode 1. The latter forms both the electrically conducting part 12 and the detecting electrode. Thus the system for accessing the vehicle is triggered by approaching or touching this detecting electrode 1.

According to a variant (not shown), only part of the decorative element forms the detecting electrode. An insulating layer covers the rest of the electrode 1. In this case, presence detection is obtained by touching or approaching the uncovered part of the electrode.

However, such a detecting device may be quickly damaged. This is because the electrode is directly exposed to rain and dirt. Furthermore, this detecting device may be subjected to an electrical overload. Specifically, a user touching the electrode 1 with the ends of charged fingers applies a voltage to the processing circuit which can reach 25 kV. The processing circuit 5 generally used in such a device does not withstand such high voltages.

FIG. 3b shows a second embodiment of the invention making it possible to overcome these drawbacks. According to this variant, the decorative element DE comprises a detecting electrode 1 inserted between a first and a second insulating part 3, 7. Furthermore, the decorative element DE is covered with an electrically conducting layer 12 forming a false electrode or offset electrode 8 on the surface of the second insulating layer 7. This offset electrode 8 constitutes, with the detecting electrode 1, a capacitor which protects the electrical circuits of the device against any electrical overload.

Advantageously, this capacitor has a capacitance of about ten picofarads. The insulating parts 3, 7 may consist of layers of air, plastic or rubber.

The offset electrode 8 may, for example, be formed by a layer of paint containing electrically conducting elements.

Figure 4:
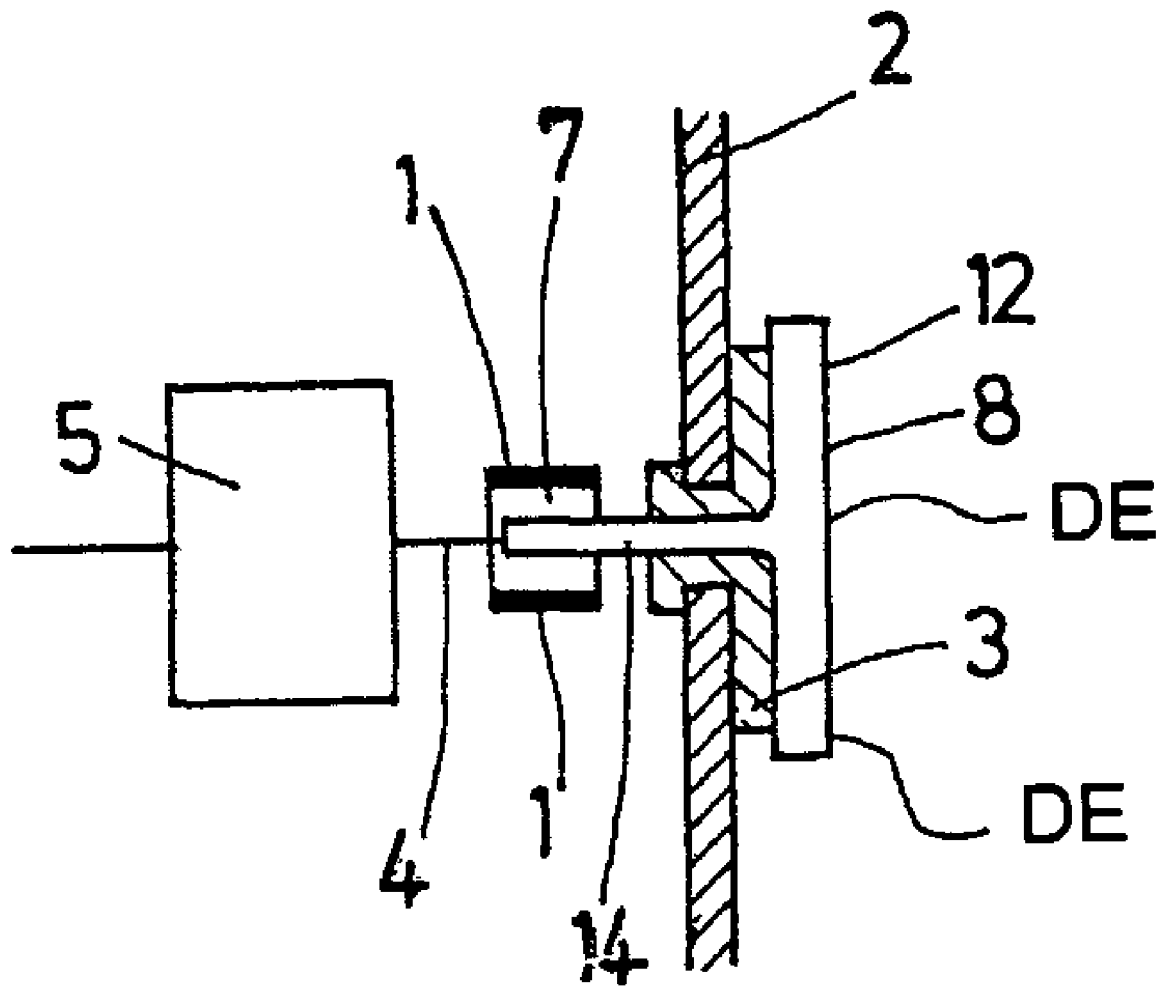
FIG. 4 presents a third embodiment of the present invention in which the electrode and the electronic processing circuit are fastened inside the vehicle.

FIG. 4 shows a third embodiment of the invention. According to this embodiment, the decorative element DE comprises a conducting tongue 14 and is covered with an electrically conducting layer, such as a paint.

The conducting tongue 14 of the decorative element DE is capable of being placed in an opening of the bodywork 2. A T-shaped insulating element 3 is placed between the bodywork 2 and the decorative element such that the latter is completely insulated electrically from the bodywork 2. The end of the tongue 14, placed inside the vehicle, supports a second insulating part 7, for example made of plastic or rubber. A detecting electrode 1 is fastened to the insulating part 7 so as to form, with one face of the conducting tongue 14, a capacitor. Thus the capacitor protects the whole electric circuit of the device against electrical overloads.

Alternatively, the detecting device may comprise two detecting electrodes 1 fastened on each side of the tongue 14 such that its sensitivity is improved.

According to a variant (not shown), the insulating part 7 consists of air. Thus, the detecting electrode 1 is fastened at some distance from the conducting tongue 14.

Advantageously, according to this embodiment, no electrical wire is accessible from the outside of the vehicle such that an ill-intentioned person desiring to steal the vehicle is prevented from short-circuiting the electrical system.

Preferably, the tongue 14 consists of the tongue for gripping the decorative element DE when it is painted. Thus, advantageously, if the vehicle already comprises a painted decorative element, it is not necessary to alter the molds for manufacturing the latter.

According to a variant embodiment of the present invention, the detecting electrode 1 and the decorative element DE have sloping faces favoring the removal of water.

FIGS. 6a, 6b and 6c show, in cross section, several possible shapes of the decorative element. The insulating part 3, inserted between the electrode 1 and the bodywork 2, makes it possible to prevent direct contact between the electrode and the bodywork, which would cause interference and hamper the detection. The insulating part 3 may have various shapes. However in all these cases, this shape must favor the flow of drops of water in order to prevent the latter stagnating in the environment close to the electrode 1. For example, the insulating part 3 of the embodiment shown in FIG. 4 forms a channel allowing the removal of water.

The choice of insulator varies according to certain restrictions such as resistance to bad weather, for example. Thus, this insulator may be Teflon (registered trademark), rubber or another plastic.

In FIG. 6a, the first insulating part has, in cross section, a truncated triangle shape and is positioned in the extension of the electrode. The water therefore flows down to the bodywork via the electrode and the first insulating layer 3. The bodywork, with a painted smooth surface, then allows the complete removal of water.

In FIG. 6b, the first insulating part 3 has two elements: a first element of truncated triangular shape in section and a second element of rectangular shape. This rectangular-shaped element has complementary means for removing water formed by the presence of water-removing grooves 11. These grooves are located mainly on the periphery of the second element of the rectangular-shaped insulator.

FIG. 6c shows another possible shape of the insulator. According to this embodiment, the first layer of insulator 3 is of circular or rounded shape.

The combination of the shape of the electrode, the shape of the first insulating layer and of complementary water-removal means always leads to a structure making it possible to optimize the water removal from the surface of the electrode and/or from the environment thereof.

The electronic circuit for processing data collected by the electrode is a commercial circuit operating by detecting a variation of capacitance between the electrode and the ground of the vehicle. Some modifications on the electronic processing circuit of the sensor are needed depending on whether it is desired to increase the sensitivity to allow detection with gloves or to decrease the sensitivity to decrease the inopportune detections. The insertion of an additional electronic component such as a resistor or capacitor between the electrode and the processing circuit makes it possible to achieve a compromise between these two situations.

FIG. 5 shows a fourth embodiment of the present invention. When the first layer of insulator 3 is thick enough and when the decorative element DE is detached a little from the bodywork, a closed housing sheltered from water can be created inside the first layer 3. This housing may incorporate the electronic processing circuit 5 which is then positioned outside the vehicle, as shown in FIG. 5. The electronic processing circuit, which is very small, a few cm$^2$, is then surrounded with insulator and becomes completely sheltered from bad weather. A connecting wire 10 connected to a management and control unit 9 of the vehicle makes it possible to transmit the information from the sensor in order to activate and/or control the desired function.

The invention claimed is:

1. A device for detecting the presence of a user in order to allow and/or prevent access to the inside of a motor vehicle, the vehicle comprising at least one decorative element fastened to the bodywork (2) close to an opening leaf (O), the device comprising at least one electrode (1) for detecting the presence of a user and a processing circuit (5) connected to the detecting electrode, wherein the decorative element (DE) has at least one electrically conducting part (12) coupled at least partially to the detecting electrode (1) so as to form an active detecting surface, the decorative element (DE) has a tongue (14) and is completely covered with a surface layer (8) forming an offset electrode, the electrically conducting part (12) comprising, the detecting electrode (1) and, the offset electrode (8), and in that a insulating part (7) is inserted between the detecting electrode (1) and the offset electrode (8) in order to form a capacitor, the detecting electrode (1) and the electronic processing circuit (5) being placed inside the vehicle so that the electrical wire (4) connecting the electrical components of the detecting device is inaccessible from outside the vehicle.

2. The detecting device as claimed in claim 1, characterized in that the offset electrode (8) is formed by a layer of electrically conducting paint.

3. The detecting device as claimed in claim 1, characterized in that the capacitor has a capacitance of around ten picofarads.

4. The detecting device as claimed in claim 1, characterized in that the insulating part (7) comprises a layer of plastic or of rubber.

5. The detecting device as claimed in claim 1, characterized in that the electrically conducting part (12) is electrically insulated from the bodywork (2) by a second insulating part (3).

6. The detecting device as claimed in claim 5, characterized in that the thickness of the second insulating part (3) is greater than about 1 mm.

7. The detecting device as claimed in claim 5, characterized In that a closed housing, sheltered from water, is made in the second insulating part (3) and designed to accommodate the electronic processing circuit (5).

8. The detecting device as claimed in claim 5, characterized in that the second insulating part (3) has at least one part forming a water channel so as to promote the removal of water.

9. The detecting device as claimed in claim 8, characterized in that said part forming a water channel is made in the form of a groove (11) made in said first part (3).

10. A device for detecting the presence of a user in order to allow and/or prevent access to the inside of a motor vehicle, the vehicle comprising at least one decorative element fastened to the bodywork close to an opening leaf, the device comprising at least one electrode for detecting the presence of a user and a processing circuit connected to the detecting electrode, wherein the decorative element has at least one electrically conducting part coupled at least partially to the detecting electrode (1) so as to form an active detecting surface, and the detecting device makes it possible to control the opening and/or closing functions of an opening leaf, after prior identification of the user.

11. A device for detecting the presence of a user in order to allow and/or prevent access to the inside of a motor vehicle, the vehicle comprising at least one decorative element fastened to the bodywork proximate an opening leaf, the device comprising at least one hands free detecting electrode detecting the presence of a user without use of a key or remote control and a processing circuit connected to the detecting electrode, wherein the decorative element has at least one electrically conducting part coincident with the detecting electrode so as to form a single active detective surface.

12. The detecting device as claimed in claim 11, further comprising a surface layer forming an offset electrode, and a first insulating part disposed between the single active detective surface and the offset electrode so as to form a capacitor.

13. The detecting device as claimed in claim 12, wherein the offset electrode is formed by a layer of electrically conducting paint.

14. The detecting device as claimed in claim 12, wherein the capacitor has a capacitance of around ten picofarads.

15. The detecting device as claimed in claim 12, wherein the first insulating part comprises a layer of plastic or of rubber.

16. The detecting device as claimed in claim 12, wherein the single active detective surface is electrically insulated from the bodywork by a second insulating part.

17. The detecting device as claimed in claim 16, wherein a thickness of the second insulating part is greater than 1 mm.

18. The detecting device as claimed in claim 12, characterized in that the single active detecting device is formed by a touch-sensitive capacitive sensor such that the decorative element forms a clearly defined touch-sensitive surface.

19. The detecting device as claimed in claim 12, wherein the decorative element has, in cross section, sloping faces promoting the removal of water.

20. The device according to claim 12, wherein the detecting device makes it possible to control locking and/or unlocking functions of the opening leaves of the vehicle, after prior identification of the user.

21. The hands-free access and/or starting system as claimed in claim 11, wherein the detecting device makes it possible to control the opening and/or closing functions of an opening leaf, after prior identification of the user.

* * * * *